United States Patent [19]
Rudolphy

[11] 3,935,145
[45] Jan. 27, 1976

[54] PROCESS FOR THE MANUFACTURE OF MODIFIED NATURAL RESIN PRODUCTS

[75] Inventor: Albert Rudolphy, Wiesbaden-Biebrich, Germany

[73] Assignee: Hoechst Aktiengesellschaft, Germany

[22] Filed: Mar. 26, 1973

[21] Appl. No.: 345,239

Related U.S. Application Data

[63] Continuation-in-part of Ser. No. 294,655, Oct. 3, 1972, Pat. No. 3,880,788.

[30] Foreign Application Priority Data

Oct. 8, 1971  Germany............................ 2150216
Mar. 29, 1972  Germany............................ 2215235
Mar. 29, 1972  Germany............................ 2215293

[52] U.S. Cl........... 260/27 BB; 260/27 R; 260/97.5; 260/101
[51] Int. Cl.²........................................... C08L 93/00
[58] Field of Search............ 260/28.5 A, 27 R, 29.1, 260/27 BB, 876, 101, 97.5, 24

[56] References Cited
UNITED STATES PATENTS

| | | | |
|---|---|---|---|
| 2,311,200 | 2/1943 | Auer | 260/106 |
| 2,380,192 | 7/1945 | Schlaanstine | 260/20 |
| 2,439,824 | 4/1948 | Rostler | 260/25 |
| 2,802,797 | 8/1957 | Lerch | 260/25 |
| 2,938,876 | 5/1960 | Morris | 260/25 |
| 2,995,537 | 8/1961 | Thompson | 260/27 |
| 3,299,034 | 1/1967 | Nishiura | 260/101 |
| 3,360,488 | 12/1967 | Hall | 260/23 |
| 3,489,704 | 1/1970 | Dunham | 260/876 R |
| 3,654,203 | 4/1972 | Daimer | 260/19 UA |

*Primary Examiner*—Lewis T. Jacobs
*Assistant Examiner*—William Parker
*Attorney, Agent, or Firm*—Littlepage, Quaintance, Murphy & Dobyns

[57] ABSTRACT

A process for the manufacture of a modified natural resin product wherein (a) a natural resin is reacted with (b) at least one ethylenically unsaturated monomer capable of being added to a natural resin, having from 2 to 12 carbon atoms and being free from carboxylic groups and anhydride groups, and (c) and more than 5%, referred to the weight of the natural resin, of an $\alpha,\beta$-olefinically unsaturated carboxylic acid or a derivative thereof yielding carboxylic groups under the reaction conditions. The invention is also concerned with resinous compositions, particularly adhesives and printing inks.

10 Claims, No Drawings

PROCESS FOR THE MANUFACTURE OF MODIFIED NATURAL RESIN PRODUCTS

This application is a continuation-in-part of application Ser. No. 294,655, filled Oct. 3, 1972, now U.S. Pat. No. 3,880,788, issued Apr. 29, 1975.

This invention relates to a process for the preparation of modified natural resin products.

A number of processes are known by means of which synthetic resins for various applications can be produced from natural resins by condensation or other reactions. For example one may modify natural resin acids by reaction with unsaturated mono- or dicarboxylic acids or their anhydrides or acrylonitrile or acrylates. These products can be at least partially esterified or reacted with suitable metal compounds to form resinates by salt formation.

This modification may, for example, be effected by adding monocarboxylic resin acids of colophony whereupon there will be obtained resin acid derivatives with several carboxyl groups. The character of the product obtained is determined by the type and quantity of the modifying component. In general the major proportion of the original natural resin acid is a mono-carboxylic acid. Thus, for example, if maleic acid or fumaric acid are to the natural resin acid a tricarboxylic acid is obtained whereas, if acrylic acid is reacted a dicarboxylic acid is obtained.

It is also possible to produce high molecular weight products, in particular products having high-melting points a and high-viscosity, by reacting natural resin acids with olefinically unsaturated dicarboxylic acids and by subsequent esterification with polyhydric alcohols. However such products, when compounded with pigments, generally have reduced storage stability and tend to thicken in a relatively short time. Furthermore, the ester group content of these products is limited by the functionality of the reagents. Thus, when esterifying the di- or tricarboxylic acid formed a maximum of two or three ester groups can be obtained. Regard must however be had to the nature of the polyhydric alcohol since a trihydric alcohol such as glycerol and a tetrahydric alcohol such as pentaerythritol form a maximum of three or four ester groups. Thus the proportion of unsaturated carboxylic acids must be limited relative to colophony to avoid gelation of the resins during the esterification.

It is also known to add unsaturated compounds such as styrene or butadiene or the like to natural resin acids under the influence of Friedel-Crafts catalysts or mineral acids in the presence of inert solvents. By reacting these addition products with suitable metal compounds salt-like derivatives (resinates) of the modifying natural resin products are obtained which are used for the production of drying-oil containing surface coating compositions.

These known reaction products have the disadvantage that they are not suitable for many applications, e.g. for printing ink binders, because they have a relatively low molecular weight and are little cross-linked and therefore are generally of very low-viscosity and soft. This disadvantage is particularly important if the products are used as binders in printing inks, e.g. for toluene rotogravure printing since they do not release the solvent sufficiently rapidly and thus allow the binder to penetrate in an undesirable manner into the pores of the paper to be printed. In addition the reaction products do not have a good pigment wetting characteristics.

In order to reduce or even avoid these disadvantages we have proposed, in patent application Ser. No. 294,655 the use of modified natural resin products.

In patent application Ser. No. 294,655 there is described and claimed a process for the manufacture of a modified natural resin product wherein (a) a natural resin is reacted with (b) at least one ethylenically unsaturated monomer free from carboxylic groups and anhydride groups, and (c) a phenol resin per se or its components.

The resulting reaction product may if desired be at least partially esterified with polyhydric alcohols and may also if desired be reacted with minor quantities of carboxylic acids. If desired, the esterified or unesterified reaction products may be reacted with metal compounds to form metal salts.

The present invention is concerned with improvement in or modification of the invention claimed in patent application Ser. No. 294,655. In particular we have been able to dispense with the use of component (c), the phenolic resin. We have found that the presence of the phenolic resin may be obviated by reacting components (a) and (b) with a minor proportion of unsaturated carboxylic acid.

The invention provides a process for the manufacture of a modified natural resin product which comprises reacting (a) a natural resin, (b) an ethylenically unsaturated dienophilic monomer free from carboxylic groups and anhydride groups and (c) an $\alpha,\beta$-olefinically unsaturated carboxylic acid component in a proportion of at least 5% by weight based on the natural resin.

The $\alpha,\beta$-olefinically unsaturated carboxylic acid component (c) is preferably employed in an amount of from 10 to 30% by weight based on the natural resin. Components (a), (b) and (c) can be reacted simultaneously or successively.

The unsaturated carboxylic acid which according to the invention is added to the natural resin in the indicated proportions raises the functionality of the reaction components by providing more carboxylic acid residues so that the cross-linking level of the resins is, in turn increased. However, this effect is compensated for or kept to within limits by incorporating unsaturated monomers (b) containing no free carboxyl groups in proportions such that the resins produced according to the invention have the solubility in organic solvents necessary for their use. Due to the simultaneous reaction with unsaturated monomers according to the invention much higher proportions of unsaturated carboxylic acid components can be incorporated in the resin than with the reaction products of natural resin acids with unsaturated carboxylic acids hitherto known. The increased proportion of carboxylic groups or anhydride ester or carboxyl groups formed therefrom results in particularly good pigment-wetting characteristics of the reaction products being obtained concomitant with improved storage stability of the binders produced therefrom.

The natural resin can for example be present in the form of natural resin acids such as colophony, wood resin, tall oil, abietic acid, levopimaric acid or the like.

The $\alpha,\beta$-olefinically unsaturated carboxylic acid is preferably dienophilic. Suitable $\alpha,\beta$-olefinically unsaturated carboxylic acids include mono- and/or dicarboxylic acids such as maleic acid, fumaric acid, acrylic and/or methacrylic acid or their derivatives such as anhydrides, in as far as they exist, esters, amides or the like. Additionally telomers of dicarboxylic acids may also be reacted. Dicarboxylic acid components and, in particular, maleic anhydride are preferred. Usually up to 1 mol of the unsaturated carboxylic acid component is added to a resin acid molecule. If these acids are used in excess, based on the natural resin, at least 10 and appropriately a maximum of 30% by weight should be added to the natural resin. The proportion of unsaturated acids can in fact rise to such an extent that their quantity is above the maximum quantity which can be found by the natural resin proportion.

Suitable unsaturated monomers for use as component (b) are styrene, α-methylstyrene, the various vinyltoluenes, indene, cyclopentadiene and other olefins or olefin-containing hydrocarbon fractions, such as for example obtained in processing petroleum and coal tar, either singly or in mixture. The proportion of monomers is generally 0.2 to 20, preferably 10 to 16% by weight based on the total reaction product. Appropriately up to 1 mol of monomer is reacted with 1 mol of natural resin. The proportion of monomers is particularly important if there is to be an esterification of the unsaturated carboxylic acid in order to prevent undesired gelling. Generally the higher the proportion of unsaturated carboxylic acid the higher the proportion of monomers (b) used.

If catalysts are used for the reaction with the monomers peroxides such as di-tert.-butylperoxide, dilauroylperoxide; dicumylperoxide; 2,5-dimethyl-2,5-bis-(tert.-butylperoxy)hexane; 2,5-dimethyl-2,5-bis-(tert.-butylperoxy)-hexene; dibenzoylperoxide; cumene hydroperoxide and/or accelerating metal salts such as cobalt salts, in particular cobalt carbonate, are suitable. If these catalysts are employed it is possible to work at temperatures of e.g. 120° to 200°C, preferably 150° to 185°C. A reaction can also take place without catalysts at 200° to 280°C, preferably 250° to 270°C.

Esterification of the carboxylic acids can take place before or preferably, after the addition thereof. Suitable polyhydric alcohols for esterification are at least dihydric alcohols such as ethane-, propane-, butane- or hexanediols, glycerol, trimethylol-ethane or -propane, pentaerythritol, sorbitol, epoxy compounds obtained from polynuclear phenols such as diphenylolpropane, novolacs, terpenephenol resins and other phenol adduct resins by reaction with an alkylene oxide such as ethylene oxide or propylene oxide with ethylenechlorohydrin, epichlorohydrin or the like. The esterification not only brings about a reduction of the acid number but also a molecule enlargement and therefore an increase in the viscosity and the melting point of the product.

If desired non-polymerisable acids such as aromatic and/or aliphatic or cycloaliphatic mono- or polycarboxylic acids can additionally be used. The proportion of these additional carboxylic acids is however small and can represent for example up to 5% by weight based on the natural resin. Suitable acids are for example benzoic acid, succinic acid, adipic acid, phthalic acids such as orthophthalic acid, isophthalic acid, phenolcarboxylic acid, trimellitic acid, hexahydrophthalic acid, endomethylenetetra or -hexahydrophthalic acids or their anhydrides where they exist. According to the process of the invention it is possible therefore to obtain natural resinates e.g. of polyhydric alcohols esterified with various acids. Any acid present in the reaction mixture and not reacted with the natural resin can e.g. form with the alcohols unsaturated polyesters which can also cross-link with the unsaturated monomers.

The products of the process according to the present invention may be reacted with a metal to form a salt or resinate. Suitable components for this reaction are metal compounds of the first and/or second Group of the Periodic System such as magnesium, calcium and zinc compounds particularly oxides and salts thereof such as magnesium oxide, magnesium acetate, calcium oxide, calcium acetate, zinc oxide, -acetate, and -carbonate, and sodium acetate. One may also use compounds of polyvalent metal e.g. those of aluminium and titanium such as aluminium and titanium alkoxides or the like. The metal salt groups react substantially neutrally. Like the esterification products, the slightly acid or substantially neutral metal salts have good compatibility with pigments. In addition provided the content of the metal salts is sufficiently small to ensure that they do not make the reaction mixture basic during esterification a more rapid reaction occurs and products are formed with a higher melting point. As a result of the metal salts solvents are given off more rapidly in the case of printing ink binders.

If the reaction products are obtained in the form of their metal resinates it is advantageous if the metal content is 1 to 7, preferably 2 to 4.5% by weight based on the total reaction product. Often combinations of metals e.g. of magnesium salts with calcium or calcium and zinc salts in a weight ratio of from 2:1 to 1:2 may be used with advantage.

The reaction between the natural resin, the unsaturated carboxylic acid component and the unsaturated monomer can be performed in any desired order. For example, the natural resin can first be reacted with the unsaturated carboxylic acid component or the monomer and then the other components and optionally further reagents such as polyhydric alcohol and/ or metal compounds and/or additional carboxylic acids can be reacted. A further possibility is that e.g. firstly only the unsaturated carboxylic acid component is reacted with the monomer e.g. maleic acid with styrene in a known manner such as in the form of a telomerisation process. A simple and preferred example of this type is the joint reaction of colophony with maleic anhydride and styrene. Colophony or the unsaturated natural resin acids $C_{20}H_{30}O_2$ such as abietic acid or levopimaric acid contained therein give with maleic anhydride by diene reaction in known manner the anhydride of a tricarboxylic acid, the levopimaric-maleic anhydride adduct. The reaction with the unsaturated monomers is completed by addition in the range of the double bonds of the natural resinic acid. The reaction product must however always contain a minimum quantity of carboxyl groups as brought about by the above-indicated minimum proportion of carboxylic acid component (c). As a result of this minimum proportion in generally the resins obtained are higher melting than when using saturated and/or aromatic dicarboxylic acids and unsaturated monomer (b) alone. Furthermore with the process according to the invention if component (b) consists wholly or substantially of styrene, styrene derivatives or other unsaturated hydrocarbons with a cyclic structure these can be chemically reacted at temperatures of from 150° to 250°C with colophony. and unsaturated natural resin acids by thermal action.

However a reaction between maleic anhydride and styrene generally only takes place under special conditions particularly under the action of radical-forming substances such as peroxides or by energy-rich radiation. It then takes place as a copolymerisation process, but can also be performed as a telomerisation process in the presence of further chain-breaking components.

However it was not known, and could not be foreseen, that when jointly heating natural resin acids, maleic anhydride or styrene or similar behaving components there would also be a reaction between maleic anhydride and styrene without adding peroxides or other adjuvants whereby the maleic anhydride not reacted by adding to the unsaturated natural resinic acid reacts with styrene.

The process proceeds particularly advantageously if the unsaturated monomers in the first stage at least partially serve as solvents. These monomeric compounds can serve both as solvents or entraining agents for removing reaction water and for chemical incorporation into the reaction products.

In place of, or together with, the modifying carboxylic acid it is also possible to use other resins for modifying the natural resin serving as the starting material or the products obtained according to the invention for example coumarone-indene resins, hydrocarbons, ketone resins such as cyclohexanone resins, methylethylketone aldehyde resins, benzophenone aldehyde resins. These resins which have a relatively low average molecular weight usually under 2000 are not themselves particularly well suited as printing ink binders, but can serve as non-volatile thinners for the products of the invention. It is also possible to use even higher molecular weight resins provided that in the reaction according to the invention they can be converted by the thermal treatment into low molecular weight resins. The proportion of modifying resins can amount up to 250% by weight based on the natural resin. The modification can for example take place by chemical reaction or by mixing alone.

The proportion of natural resins in the reaction products can therefore vary in general within the range 15 to 85, preferably 20 to 70% by weight based on the total reaction product. Surprisingly, products with a relatively low natural resin content of for example only 15% by weight or even less of colophony have just as good printing characteristics as the hitherto known products with a higher colophony content. The colophony proportion can therefore be kept relatively low which is of considerable advantage and importance with increasing scarcity of natural resin.

The resins obtained according to the invention which contain a high proportion of polar groups and which can e.g. contain acid, ester and/or carboxyl or anhydride groups have high melting points and are nevertheless readily soluble in many solvents, in particular aromatic substances such as toluene, xylene or solvent mixtures containing aromatic substances. In addition they are clear and light-resistant. As the resins give off the solvents very rapidly they are particularly suitable for producing printing ink binders, preferably for toluene rotogravure printing. This applies in particular for those reaction products which contain metal salts in the form of resinates of magnesium salts or calcium and zinc salts in the ratio 2:1 to 1:2, particularly since such products also yield inks with improved storage stability.

Depending on the intended application according to the invention products with a higher or lower viscosity can be produced. This can for example be controlled by selecting the quantity of monomer. Thus with a higher proportion of unsaturated monomers low viscosity resins are obtained because the unsaturated monomers present in the reaction products as chain-breaking agents to prevent too great a degree of cross-linking. The resins obtained according to the invention with free carboxy or anhydride groups can be further esterified with polyhydric alcohols without any gelling taking place provided that sufficient unsaturated monomer (b) is incorporated, e.g. at least 0.2% by weight based on the sum of natural resin and carboxylic acid component (c). Those products of the process according to the invention wherein the free carboxylic groups are converted into salt or ester groups are particularly readily compatible with other binders e.g. also with chlorinated rubber and pigments.

Binders obtained from the resins according to the invention are characterised by very good adhesion to the most varied substrates so that they are particularly suitable for use as printing foils of the most varied type for example those made from polyolefins such as polyethylene and polypropylene. In addition the resins are suitable as binders for other purposes particularly in combination with other polymers such as natural and synthetic rubbers, fatty oils, alkyd resins and other film-forming agents so that they can be used, for example, in paints, adhesives and sealants. Generally the rapid release of the solvent, the good pigment wetting, the high storage stability and the good compatibility are also advantageous in these applications. In adhesive substances containing chlorobutadiene rubber resins produced according to the invention can increase the so-called open assembly time but still ensure good strength values.

The following examples illustrate the invention. In the Examples percentages referred to are % by weight. The melting points are determined according to the capillary method. The viscosity figures relate to 50% solutions in toluene at 20°C, determined according to Ubbelohde.

EXAMPLE 1

1,000 g of Portuguese colophony are melted. At 170°C 250 g of maleic anhydride are added and the mixture is held for 30 minutes at 200°C. 10 g of zinc oxide are then added and, after a further 30 minutes, 233g of glycerol and 200 g of styrene are added together. The mixture is strongly heated under reflux with separation of the water formed and return of styrene. After reaching a temperature of 240°C, a further 200 g of styrene are added dropwise over 1 hour and the mixture is then heated until the temperature reaches 260° to 270°C. After adding three portions each of 10 ml of xylene the mixing temperature is kept constant by vigorous refluxing. The solvent is then removed by distilling for 15 minutes at 25 mm Hg and 1,700 g of solid resin with a melting point of 131°C, an acid number of 56 and a viscosity of 96 cP are obtained.

Comparative test to EXAMPLE 1

Example 1 is repeated except that no styrene is used. The mixture gels on reaching a temperature of 230°C. Thus no usable resin is obtained if no monomer is used.

EXAMPLE 2

1,000 g of Portuguese colophony are heated to 170°C and 50 g of maleic anhydride are added. The mixture is heated to 250°C over a period of 30 minutes. 250 g of pentaerythritol and 100 g of styrene are then added and the mixture is heated to 270°C over 70 minutes with continual removal of water formed. The mixture is cooled to 230°C and 160 g of isophthalic acid are added and the temperature is raised to 270°C with continual removal of water and continual return of the refluxing styrene. Xylene is added and the temperature is maintained at 270°C with return of the entraining agent until a total of 100 ml of water are separated. The mixture is then heated for 5 minutes at 270°C and at a pressure of 20 mm Hg to yield 1,391 g of solid resin with a melting point of 115°C, an acid number of 26.4 and a viscosity of 164 cP.

The resin produced is very suitable for producing toluene rotogravure inks for printing paper, particularly polyethylene or polypropylene foils. These impressions resist the tearing test with adhesive strips.

Comparative test to EXAMPLE 2

Example 2 was repeated except that, in place of 100 g of styrene, 30 g of xylene are added. After removing 100 ml of the water formed the esterification product gels after heating the mixture for 3 hours at 270°C. The yield is 1,310 g of gelled resin.

EXAMPLE 3

To 1,000 g of molten colophony are added at 160°C 250 g of maleic anhydride. The mixture is heated for 1 hour to 200°C and then 10 g of zinc oxide, 233 g of glycerol and 200 g of styrene are added. The resulting mixture is heated to 240°C with return of the refluxing styrene and removal of the liberated water and at this temperature within 45 minutes 200 g of vinyltoluene are added and after further heating the mixture is held for 3 hours at 265°C. Subsequently the non-reacted monomer is removed by distillation for 15 minutes under reduced pressure. 1,770 g of solid resin with a melting point of 132°C, an acid number of 53 and a viscosity of 135 cP are obtained.

EXAMPLE 4

2,250 g of colophony are reacted with 525 g of styrene for 5½ hours with the removal of 2 ml of water at 270°C. 617 g of the reaction product obtained are heated for 30 minutes at 200°C with 91.8 g of maleic acid. 5 g of zinc oxide are then added and reaction is continued at this temperature for 10 minutes. The mixture is refluxed at 240°C with water removal accompanied by the dropwise addition of 101 g of glycerol. At this temperature within 2 hours 83 g of styrene are added and the temperature of the mixture rises to 260°C within 40 minutes. After adding 240 ml of xylene the reaction mixture is held for about 2 hours at this temperature and the volatile constituents are then removed. A total of 46 ml of water is separated. 790 g of resin are obtained. Characteristics: melting point 105°C, acid number 36, viscosity 88 cP.

EXAMPLE 5

400 g of maleic anhydride are added to 1,500 g of molten colophony at 160°C. When the exothermal reaction has subsided the mixture is held for 1 hour at 250°C and then 400 g of styrene are added dropwise within 2 hours at 240° to 250°C and the mixture is kept for 2 hours at this temperature. Within 20 minutes 100 g of zinc oxide and 25 g of calcium acetate are added portionwise as well as a total of 70 ml of xylene. The mixture is heated to 260°C accompanied by water removal. Subsequently the volatile ingredients are removed by distillation at 260°C for 15 minutes. 2,173 g of resin are obtained. Characteristics: melting point 117°C, acid number 152, viscosity 33 cP.

EXAMPLE 6

Example 5 is repeated except that 600 g of maleic anhydride in 400 g of styrene are used. In addition, after adding the zinc oxide and calcium acetate, 100 g of glycerol are also added. 2,340 g of resin are obtained. Characteristics: melting point 133°C, acid number 120, viscosity 68 cP.

EXAMPLE 7

1,500 g of colophony are melted and at 160°C mixed with 800 g of maleic anhydride. After exothermal reaction the mixture is heated for 1 hour to 220°C and then 800 g of styrene are added dropwise at 210° to 220°C over a period of 5½ hours. The mixture temperature is raised by refluxing to 260°C and the mixture is left at this temperature for 2 hours. 2,900 g of resin are obtained. Characteristics: melting point 91°C, acid number 320, viscosity 27 cP.

1,000 g of the resin obtained are dissolved in a mixture of 500 g of isobutyl alcohol and 80 g of 33% caustic soda solution and then water and butyl alcohol are distilled off. After heating to 220°C, the volatile ingredients are removed under reduced pressure and, after heating to 260°C, 1,020 g of resin are obtained. Characteristics: melting point 109°C, acid number 135, viscosity 73 cP.

This resin after processing as a binder for toluene intaglio printing inks rapidly releases the solvent and has a high degree of brightness.

Printing Test

The binders are dissolved in toluene as a 50% solution and are processed with 20% by weight based on the solid content of "Pigmentrot 57" (calcium salt varnish of β-hydroxynaphthoic acid) by means of a rapidly rotating glass ball mill to a particle size of less than 5 μ. The printing inks obtained are set to a discharge time of 17 seconds by adding toluene to a 4 mm DIN-beaker and are applied to a machine-coated paper or a non-absorptive terephthalate foil by means of a 36 μ hand coater. The drying speeds in seconds are determined by contact with the side of the hand. The printing ink coatings obtained on paper are stored overnight and the gloss is measured by means of a LANGE glossmeter.

The residue of the inks was then determined. On a metal sheet 2 g of toluene was coated over 2 g of ink and the mass was treated for one-half hour at 150°C in a drying cubicle. The residue was then determined.

The results are given in the following table 1.

Table 1

| | Examples | | |
|---|---|---|---|
| | 5 | 6 | 7 |
| Residue of inks as a % | 53.8 | 51.4 | 48.6 |
| Solvent given off in seconds from: | | | |
| machine coated paper | 55 | 40 | 55 |
| Terephthalate foil | 65 | 47 | 60 |

Table 1-continued

| | Examples | | |
|---|---|---|---|
| | 5 | 6 | 7 |
| gloss values according to Lange | 100 | 85 | 90 |
| Discharge times in sec./ 23°C (DIN-beaker, 4 mm) | 16.8 | 17.7 | 16.8 |
| After 30 days storage | 19.8 | 18.7 | 20.2 |

EXAMPLE 8

1,500 g of molten colophony are mixed with 375 g of maleic anhydride and the mixture is heated for 1 hour at 200°C. At this temperature 15 g of zinc oxide are added and, after a further 15 minutes, 350 g of glycerol and 300 g indene are added. After heating to 240°C with water removal and return of the refluxing indene a further 225 g of indene are added within 5 hours at 240°C. The mixture temperature rises within 3 hours to 260°C and is maintained for a further hour. The volatile ingredients are then removed over 15 minutes at 260°C. 2,304 g of resin are obtained with a colophony content of 65.3% by weight. Characteristics: melting point 146°C, acid number 50, viscosity 261 cP.

EXAMPLE 9

Example 8 is repeated except that in place of 300 g of indene initially 300 g of styrene are added and, in the second stage, 300 g of indene added in place of 250 g. At 250°C, 5 g of p-tert.-butyl peroxide are added dropwise over 15 minutes. The mixture is maintained at 260°C for 1 hour and the volatile ingredients are removed for 15 minutes. 2,460 g of resin with a colophony content of 61.3% by weight are obtained. Characteristics: melting point 140°C, acid number 49, viscosity 197 cP.

EXAMPLE 10

1,000 g of colophony and 250 g of maleic anhydride are heated for 30 minutes to 200°C, and then 10 g of zinc oxide and after 10 minutes 233 g of glycerol and 200 g of vinyltoluene are added. Heating takes place at 240°C with return of the refluxing monomer and with water removal and then a further 200 g of vinyl toluene are added over 60 minutes. The temperature rises over 10 minutes to 260°C and is maintained under gradual addition of 50 ml of xylene for 3½ hours. Then the volatile ingredients are removed and 1,700 g of resin with a colophony content of 58.8% by weight are obtained. Characteristics: melting point 134°C, acid number 52, viscosity 131 cP.

If the first added quantity of vinyltoluene is replaced by the same quantity of styrene, a resin with analogous advantageous characteristics are obtained.

EXAMPLE 11

Example 10 is repeated except that, in place of xylene as the entraining agent, 50 ml of a hydrocarbon fraction (olefin content about 35%, styrene 24.4%, α-methyl styrene 0.3%, β-methyl styrene 1.4%, dihydrodicyclopentadiene 2.7%, vinyltoluene 11%, indene 5.2%) are used. 1,719 g of resin are obtained with the following characteristics: melting point 134°C, acid number 52, viscosity 140 cP.

EXAMPLE 12

500 g of colophony and 135 g of maleic anhydride are heated for one-half hour to 200°C and 5 g of zinc oxide are added. After 10 minutes 117 g of glycerol and 100 g of a petroleum fraction as in Example 11 are added. The mixture is refluxed for 5 hours at 205°C with water removal. The volatile ingredients are then removed by heating to 225° to 260°C under reduced pressure. 685 g of resin are obtained with the following characteristics: melting point 144°C, acid number 70, viscosity 295 cP.

Working without the addition of the petroleum fraction the mixture gels at 240°C.

Printing test

The printing test was performed as described above. The results obtained can be gathered from the following Table 2.

Table 2

| | Examples | | | | |
|---|---|---|---|---|---|
| | 8 | 9 | 10 | 11 | 12 |
| Residue of inks as a % | 41.6 | 41.8 | 46.3 | 45.5 | 45.6 |
| Solvent given off in seconds: | | | | | |
| machine coated paper | 55 | 45 | 50 | 50 | 65 |
| terephthalate foil | 63 | 65 | 56 | 55 | 70 |
| gloss values according to Lange | 81 | 96 | 90 | 91 | 72 |
| Discharge Times in sec./ 23°C (DIN-beaker, 4mm) | 16.8 | 17 | 17.2 | 16.7 | 16.9 |
| After 30 days storage | 23 | 21.4 | 21 | 21 | 20 |

EXAMPLE 13

1,500 of colophony are melted together with 450 g of a hydrocarbon resin and reacted with about 5% by weight of maleic anhydride (melting point 145°C, acid number 28, viscosity 120 cP) with the addition of 375 g of maleic anhydride heated for 30 minutes to 200° to 220°C. 15 g of zinc oxide are added and, after 15 minutes at 200°C, 350 g of glycerol and 300 g of styrene are added. The mixture is heated to 240°C and within 3 hours a further 300 g of styrene are added with return of the refluxing styrene and removal of the liberated water. Heating then takes place to 260°C with the addition of a total of 40 ml of xylene this temperature is maintained for 1 hour and then the volatile ingredients are removed. 300 g of resin with a colophony content of 50% by weight are obtained. Characteristics: melting point 132°C, acid number 50, viscosity 192 cP.

EXAMPLE 14

1,500 g of colophony are heated for one-half hour at 200°C with 600 g of a hydrocarbon resin (melting point 133°C, acid number 0, viscosity 85 cP) and 375 g of maleic anhydride. Then 40 g of pentaerythritol, 315 g of glycerol and 300 g of styrene are added and the mixture is heated to 240°C with return of the refluxing styrene and removal of the water liberated, followed by the addition of a further 300 g of styrene and working as in Example 13. 3,177 g of resin with a colophony content of 47.3% by weight are obtained. Characteristics: melting point 130°C, acid number 46, viscosity 231 cP.

EXAMPLE 15

1,500 g of colophony are melted with 750 g of a styrene-maleic anhydride telomer (molar ratio 8:1, melting point 108°C, acid number 65, viscosity 78 cP) and heated with 250 g of maleic anhydride for 30 minutes at 200°C. 310 g of glycerol and 300 g of vinyltoluene are added and the mixture is heated to 240°C with return of the refluxing vinyltoluene and removal of the liberated water. Then within 3 hours at this temperature a mixture of 150 g of vinyltoluene, 100 g of indene and 50 g of α-methyl styrene are added dropwise. Working is then continued as in Example 14. 3,188 g of a resin with a colophony content of 47% by weight are obtained. Characteristics: melting point 104°C, acid number 45, viscosity 62 cP.

Printing test

The results of the printing test are given in Table 3.

TABLE 3

|  | Examples | | |
|---|---|---|---|
|  | 13 | 14 | 15 |
| Residue of inks as a % | 46.8 | 44.5 | 45.5 |
| Solvent given off in seconds: | | | |
| machine coated paper | 50 | 46 | 57 |
| terephthalate foil | 53 | 46 | 57 |
| gloss values according to Lange | 89 | 85 | 100 |
| Discharge times in sec./ 23°C (DIN-beaker, 4 mm) | 17.2 | 16.8 | 16.8 |
| After 30 days storage: | 19.4 | 19.8 | 18.6 |

EXAMPLE 16

150 g of colophony and 600 g of a maleic anhydridestyrene telomer (molar ratio 1:1) are heated to 200°C for 1 hour with 15 g of maleic anhydride and then 20 g of pentaerythritol 17.5 g of glycerol and 50 g of styrene are added. The mixture is heated to 260°C with return of the refluxing styrene and removal of the liberated water and held at this temperature for 3 hours whereby, as the entraining agent, 30 ml of xylene are added. The volatile ingredients are removed subsequently. 837 g of a resin with a colophony content of 18% by weight are obtained. Characteristics: melting point 99°C, acid number 47, viscosity 188 cP.

EXAMPLE 17

150 g of colophony, 600 g of a telomer according to Example 16 and a mixture of in each case 25 g of a neutral hydrocarbon resin as in Example 14 two further hydrocarbon resins of different viscosity (characteristics of resin I: melting point 95°C, acid number 0, viscosity 19 cP, characteristics of resin II: melting point 118°C, acid number 0, viscosity 36 cP) and finally a high-melting polar hydrocarbon resin as in Example 13 are heated with 45 g of maleic anhydride for 1 hour at 200°C and then 33 g of pentaerythritol and 220 g of a 70% butanol solution of a propoxylated novolak (OH number 260 calculated as solid resin) are added. The temperature drops to 150°C. To remove the butanol the mixture is heated to 200°C under reduced pressure. Then refluxing again takes place with water removal and 100 g of styrene are added. On reaching 260°C the mixture is held at this temperature for a further 3 hours. A total of 30 ml of xylene are added and finally the volatile ingredients are removed. 1,128 g of a resin with a colophony content of 14.7% by weight are obtained, characteristics: melting point 106°C, acid number 40, viscosity 540 cP.

EXAMPLE 18

500 g of colophony are refluxed for 2 hours to 270°C with 100 g of vinyltoluene. Then 500 g of a telomer of 1 mol of maleic anhydride and 2 mol of styrene (melting point 125°C, acid number 240, viscosity in 50% ethylene glycol monobutylether solution 15,00 cP) followed by heated for 3 hours to 260° to 270°C. 20 g of zinc oxide, 40 g of glycerin and 50 g of styrene are then added at a temperature of 240°C. The mixture is heated to 260°C with return of the refluxing solvent and removal of the liberated water. This temperature is maintained for 3.5 hours by gradual addition of a total of 30 g of xylene. The volatile ingredients are distilled off under reduced pressure. 1069 g of resin are obtained having a colophony content is 48.8%. Characteristics: melting point 97°C, acid number 36.5, viscosity 32 cP. The resin is well suited as a binder for rotogravure printing inks.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

I claim:

1. A process for the manufacture of a natural resin product comprising reacting (a) a natural resin selected from the group consisting of colophony, wood resin, tall oil, abietic acid and levopimaric acid with (b) at least one ethylenically unsaturated monomer capable of being added to at least one of said natural resins, said monomer containing from 2 to 12 carbon atoms and being free from carboxylic groups and anhydride groups, and (c) an α,β-olefinically unsaturated carboxylic acid or a derivative thereof selected from the group consisting of anhydrides, esters and amides which provides carboxylic groups under the reaction conditions in an amount by weight equalling more than 5% of the weight of the natural resin, but less than the weight of (a) + (b); said resin product having a melting point of at least 97°C, being soluble in organic solvents and containing said natural resin in an amount equalling about 15–85% and said monomer in an amount equalling about 0.2 to 20%, both amounts being based on the total weight of the resin.

2. A process as claimed in claim 1 wherein at least one of components (a), (b), and (c) is one of the following: (a) colophony, (b) styrene, and (c) maleic acid or maleic anhydride.

3. A process as claimed in claim 1 wherein up to one mol of the monomer is reacted with 1 mol of said natural resin.

4. A process as claimed in claim 1 wherein the reaction of said natural resin (a) and the unsaturated monomer (b) is carried out in the presence of a peroxide, a metal salt accelerator or a combination thereof.

5. A process as claimed in claim 1 wherein a product selected from the group consisting of the reaction product of claim 1 and an esterification product thereof with a polyhydric alcohol is reacted with a zinc compound, a magnesium compound or a calcium compound to yield a metal salt.

6. A process as claimed in claim 1 wherein in addition to component (c) up to 5%, calculated on the weight of said natural resin, of a non-polymerisable carboxylic acid is reacted.

7. A process as claimed in claim 1 wherein at least one further synthetic resin selected from the group consisting of coumaroneindene resins, hydrocarbons and ketone resins is reacted with the reactants or the reaction product.

8. A process as claimed in claim 1 wherein in the initial stage of the reaction the unsaturated monomer at least in part serves as a solvent.

9. A resinous composition selected from the group consisting of adhesives and printing inks in which the binding agent comprises a reaction product of claim 1.

10. An adhesive as claimed in claim 9 wherein the binding agent consists of a combination of the reaction product of claim 1 and polychlorobutadiene.

* * * * *

UNITED STATES PATENT AND TRADEMARK OFFICE
CERTIFICATE OF CORRECTION

PATENT NO. : 3,935,145
DATED : January 27, 1976
INVENTOR(S) : ALBERT RUDOLPHY

It is certified that error appears in the above-identified patent and that said Letters Patent are hereby corrected as shown below:

Col. 1, line 27, after "are" insert --added--; line 32, delete "a".
Col. 2, line 1, delete "a"; line 46, delete "to".
Col. 4, line 59, delete "generally"and insert --general--.
Col. 9, line 31, delete "250 g", insert -- 225 g --.
Col. 10, line 38, after "1,500" insert --g--.
Col. 11, last line of TABLE 3, the figures under Examples 13, 14 and 15 should read, respectively, --19.4--, --19.8--, and --18.6--.

Signed and Sealed this

Twenty-seventh Day of July 1976

[SEAL]

Attest:

RUTH C. MASON
*Attesting Officer*

C. MARSHALL DANN
*Commissioner of Patents and Trademarks*